(12) United States Patent
Chen

(10) Patent No.: US 11,452,406 B2
(45) Date of Patent: Sep. 27, 2022

(54) MULTIFUNCTIONAL FOOD PROCESSOR

(71) Applicant: SHUANGMA PLASTIC MANUFACTURING INC., Taizhou (CN)

(72) Inventor: Cuihong Chen, Taizhou (CN)

( * ) Notice: Subject to any disclaimer, the term of this patent is extended or adjusted under 35 U.S.C. 154(b) by 606 days.

(21) Appl. No.: 16/512,378

(22) Filed: Jul. 16, 2019

(65) Prior Publication Data

US 2019/0335953 A1 Nov. 7, 2019

Related U.S. Application Data

(63) Continuation of application No. PCT/CN2017/081466, filed on Apr. 21, 2017.

(51) Int. Cl.
*A47J 43/044* (2006.01)
*A47J 43/08* (2006.01)
*A47J 43/07* (2006.01)
*A47J 44/00* (2006.01)

(52) U.S. Cl.
CPC ............ *A47J 43/082* (2013.01); *A47J 43/044* (2013.01); *A47J 43/0711* (2013.01); *A47J 44/00* (2013.01)

(58) Field of Classification Search
CPC .... A47J 43/0711; A47J 43/044; A47J 43/046; A47J 43/082
See application file for complete search history.

(56) References Cited

U.S. PATENT DOCUMENTS

| | | | | |
|---|---|---|---|---|
| 3,393,900 A | * | 7/1968 | Wagner | A47J 43/085 366/288 |
| 5,156,084 A | | 10/1992 | Lin | |
| 5,222,430 A | * | 6/1993 | Wang | A47J 19/023 241/37.5 |
| 5,735,193 A | * | 4/1998 | Chang | A47J 43/044 241/37.5 |
| D433,871 S | * | 11/2000 | Wong | D7/384 |
| 6,439,760 B1 | * | 8/2002 | Langeloh | A47J 36/32 366/331 |

(Continued)

FOREIGN PATENT DOCUMENTS

| | | |
|---|---|---|
| CN | 2281138 Y | 5/1998 |
| CN | 201409835 Y | 2/2010 |

(Continued)

OTHER PUBLICATIONS

Internation Search Report of PCT/CN2017/081466, dated Jan. 24, 2018.

*Primary Examiner* — Faye Francis

(57) ABSTRACT

The invention provides a multifunctional food processor, belonging to the technical field of kitchen equipment. The multifunctional food processor includes a container (1), a top cover (3) and a drive component, wherein, a first working chamber (11) is arranged in the container (1), and a second working chamber (31) is arranged in the top cover (3); the top cover (3) is arranged on the container (1) in a matching manner, and the drive component includes a drive rod which downwardly extends from the top cover (3) and is provided with a food processing device in a matching manner. The food processing device is a stirring device (7) or a cutting device (8) mounted in the container, and is used for not only stirring food but also shredding food.

4 Claims, 9 Drawing Sheets

(56) References Cited

U.S. PATENT DOCUMENTS

| | | | | |
|---|---|---|---|---|
| 6,814,323 | B2* | 11/2004 | Starr | A47J 43/046 241/292.1 |
| 9,420,918 | B2 | 8/2016 | Cheung et al. | |
| 10,827,880 | B2* | 11/2020 | Zakowski | A47J 43/046 |
| 11,248,800 | B2* | 2/2022 | Donnelly | G05B 23/027 |
| 2003/0226923 | A1* | 12/2003 | Starr | A47J 43/046 241/282.1 |
| 2012/0091244 | A1* | 4/2012 | Loos | B02C 18/16 241/279 |
| 2014/0346262 | A1 | 11/2014 | Audette et al. | |
| 2015/0144721 | A1* | 5/2015 | Wang | A47J 43/0705 241/101.1 |
| 2015/0144723 | A1* | 5/2015 | Wang | B26D 3/283 241/259 |
| 2015/0290602 | A1 | 10/2015 | Guo et al. | |
| 2017/0215646 | A1* | 8/2017 | Zakowski | A47J 43/046 |
| 2017/0311761 | A1* | 11/2017 | Obersteiner | A47J 43/0716 |
| 2021/0030208 | A1* | 2/2021 | Zakowski | A47J 43/046 |

FOREIGN PATENT DOCUMENTS

| | | |
|---|---|---|
| CN | 203059445 U | 7/2013 |
| CN | 205410972 U | 8/2016 |
| TW | M428731 U1 | 5/2012 |

\* cited by examiner

MULTIFUNCTIONAL FOOD PROCESSOR

CROSS-REFERENCE TO RELATED APPLICATIONS

This application is designating the United States and claims foreign priority to International Patent Application No. PCT/CN2017/081466 with a filing date of Apr. 21, 2017, now pending. The content of the aforementioned applications, including any intervening amendments thereto, are incorporated herein by reference.

TECHNICAL FIELD

The utility model belongs to the technical field of kitchen equipment, and particularly relates to a multifunctional food processor.

BACKGROUND OF THE PRESENT INVENTION

A food processor is an utensil for processing food. The typical food processor slices, shreds or stir vegetables or melons and fruits. The food processor can be divided into a vertical food processor and a horizontal food processor based on its working states. The existing vertical food processor usually can only be used for stirring or slicing, and generally can only cut into slices with one shape and size, with a single function; meanwhile, when in operation, a hand is needed to grasp a material to be processed to abuts against a blade, the blade performs cutting through pushing of the hand, and the other hand is needed to put on the food processor, which facilitates fixation. Such the use mode is inconvenient and low in safety, and wastes time and labor.

SUMMARY OF PRESENT INVENTION

Aiming at the above technical defects, the present utility model provides a multifunctional food processor which is convenient to use and can not only slice food but also stir food.

The object of the present utility model is achieved as follows:

Provided is a multifunctional food processor, comprising a container, a top cover and a drive component, wherein, a first working chamber is arranged in the container, and a second working chamber is arranged in the top cover; the top cover is arranged on the container in a matching manner, and the drive component comprises a drive rod which downwardly extends from the top cover and is provided with a food processing device in a matching manner.

Preferably, the food processing device is a cutter disc device which is detachably arranged between the container and the top cover in a matching manner.

Preferably, the food processing device is detachably mounted in the first working chamber, and the food processing device is a stirring device or a cutting device which is arranged at the lower end of the drive rod.

Preferably, the drive component comprises a shaking handle, the top cover is provided with a first connection hole and a second connection hole, the shaking handle is detachably mounted on the first connection hole or the second connection hole, and the drive rod is arranged in the second connection hole.

Preferably, a drive device is also arranged in the top cover, the drive device comprising a first gear, a second gear and a third gear; the shaking handle is detachably connected to the first connection hole through the first gear, the drive rod is detachably connected to the second connection hole through the third gear, and the shaking handle drives the drive rod to rotate in the second working chamber through the drive device.

Preferably, the drive rod is detachably mounted in the top cover, the drive rod passes through the second connection hole to be located in the second working chamber, the upper end of the drive rod is detachably connected to the lower end of the shaking handle, the lower end of the drive rod is connected with the fixation disc, the periphery of the drive rod is sleeved with a first spring, the shaking handle drives food to rotate in the second working chamber through the drive rod and the fixation disc.

Preferably, a plurality of fixation teeth for fixing food are formed on the fixation disc.

Preferably, a cutting blade and a rotation knife rest are mounted on the cutter disc device, the rotation knife rest comprises a knife rest body, a limit piece, a rotation member, a second spring and a rotation idler wheel, the knife rest body is in a strip-shaped structure, the knife rest body is provided with knife teeth having different specifications and fixedly mounted on the cutter disc device through the limit piece, the rotation member is mounted on the knife rest body through the limit piece, the rotation idler wheel is arranged at the periphery of the rotation member and drives the drive device to rotate the knife rest body to rotate through the second spring.

Preferably, the lower part of the container is detachably mounted on a base, a sucking disc mounting seat is formed on the base, and a sucking disc assembly is arranged in the sucking disc mounting seat.

Preferably, the upper end of the container is protruded outwardly to form a liquid pouring hole, and the periphery of the container is also provided with a handle device.

As compared with the prior art, the present utility model has the following outstanding and beneficial effects:

1. The stirring device or the cutting device can be mounted in the container of the present utility model, which can be used for not only stirring food but also shredding food. Meanwhile, the device formed by combining the food fixation device and the cutter disc device in the top cover can be used for slicing and shredding food, so that the present utility model has multiple functions, is convenient to use, can greatly save occupied space and production and use costs.

2. The shaking handle of the present utility model can be mounted on the first connection hole and connected with the drive rod mounted in the second connection hole through the drive device to drive the drive rod to rotate in the second working chamber and drive the mounted stirring device or the cutting device to work; the shaking handle can also be mounted on the second connection hole, and at this moment, is connected with the drive rod, and a function of slicing or shredding food is achieved by combination of the food fixation device and the cutter disc device.

3. The food fixation device of the present utility model comprises a connection rod and a fixation disc, and meanwhile the periphery of the drive rod is sleeved with the first spring which is large in elasticity. In the process of operation, food is inserted into the fixation disc, at this moment, the spring is shrunk, food is cut by the cutter disc device in the process of rotating the shaking handle, the connection rod can continuously downwardly push food along with the reduction of volume of food and under the elastic force of the first spring. The user is labor-saving when in use, and high in efficiency and convenient to operate.

4. In the present utility model, the main body is provided with the rotation knife rest, the rotation knife rest is provided with knife teeth having different sizes and models, the rotation knife rest can be rotated according to the actual demand of the user to cut materials having different sizes; meanwhile, a cutting blade and a round-hole blade are also arranged on the main body so that the present utility model can cut slice-shaped, strip-shape and column-shaped slices, and has multiple functions to be selected by the user.

5. The base of the present utility model is provided with the sucking disc device, the sucking disc device can stably fix the base on a working platform when in use to avoid generation of shaking when in use. The present utility model is reasonable in design, convenient to use, labor-saving, and stable in structure.

6. Various parts of the present utility model are all in detachable connection, and therefore are convenient to detach, facilitate storage, package or transportation and do not occupy excess spaces, thereby saving package cost. Some parts are convenient to change if being damaged due to long-term use, thereby prolonging the service life of the entire device.

DETAILED DESCRIPTION OF PREFERRED EMBODIMENTS

Figure 1:
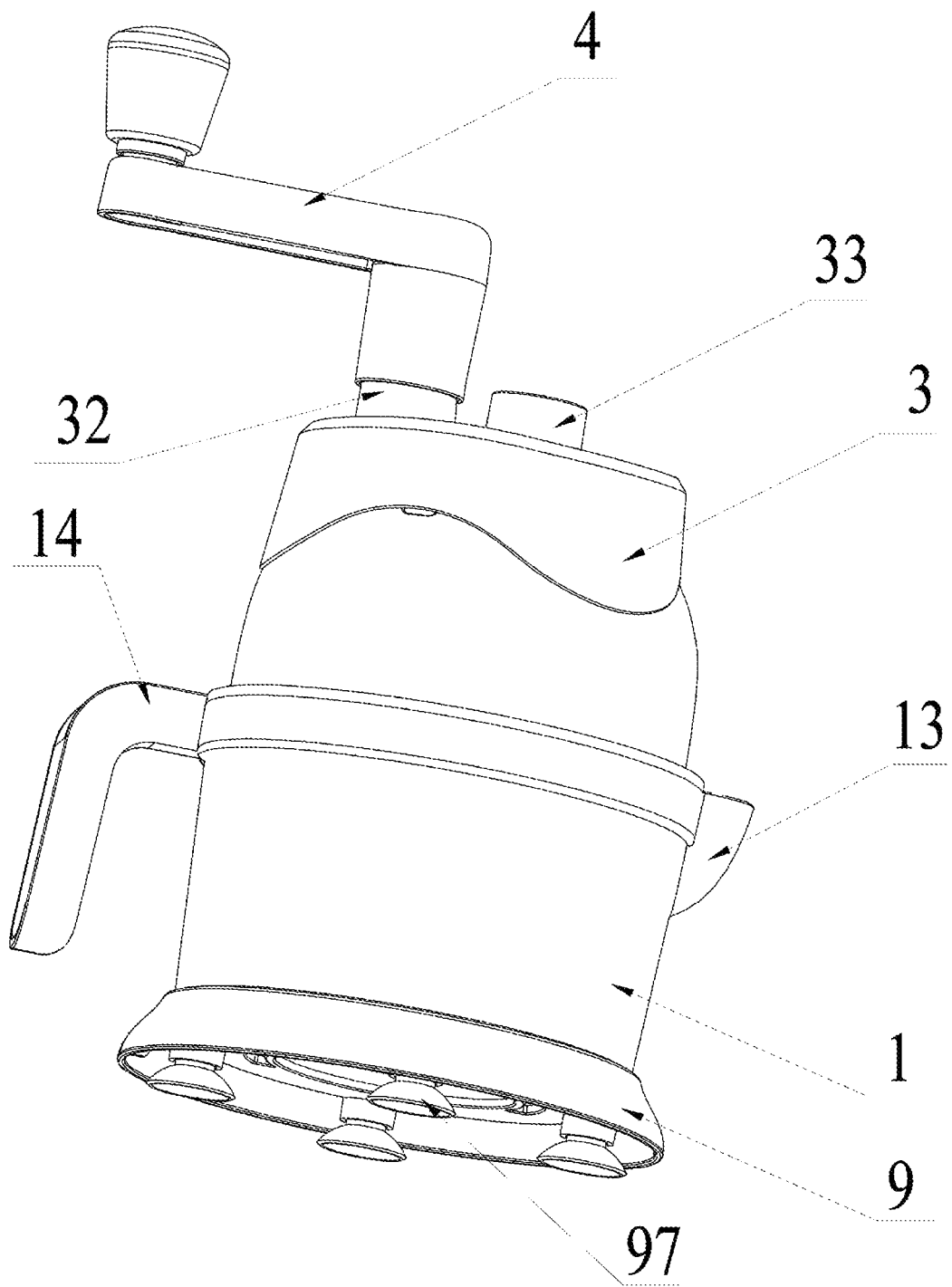
FIG. 1 is a structural diagram of a first embodiment according to the present utility model.
Figure 2:
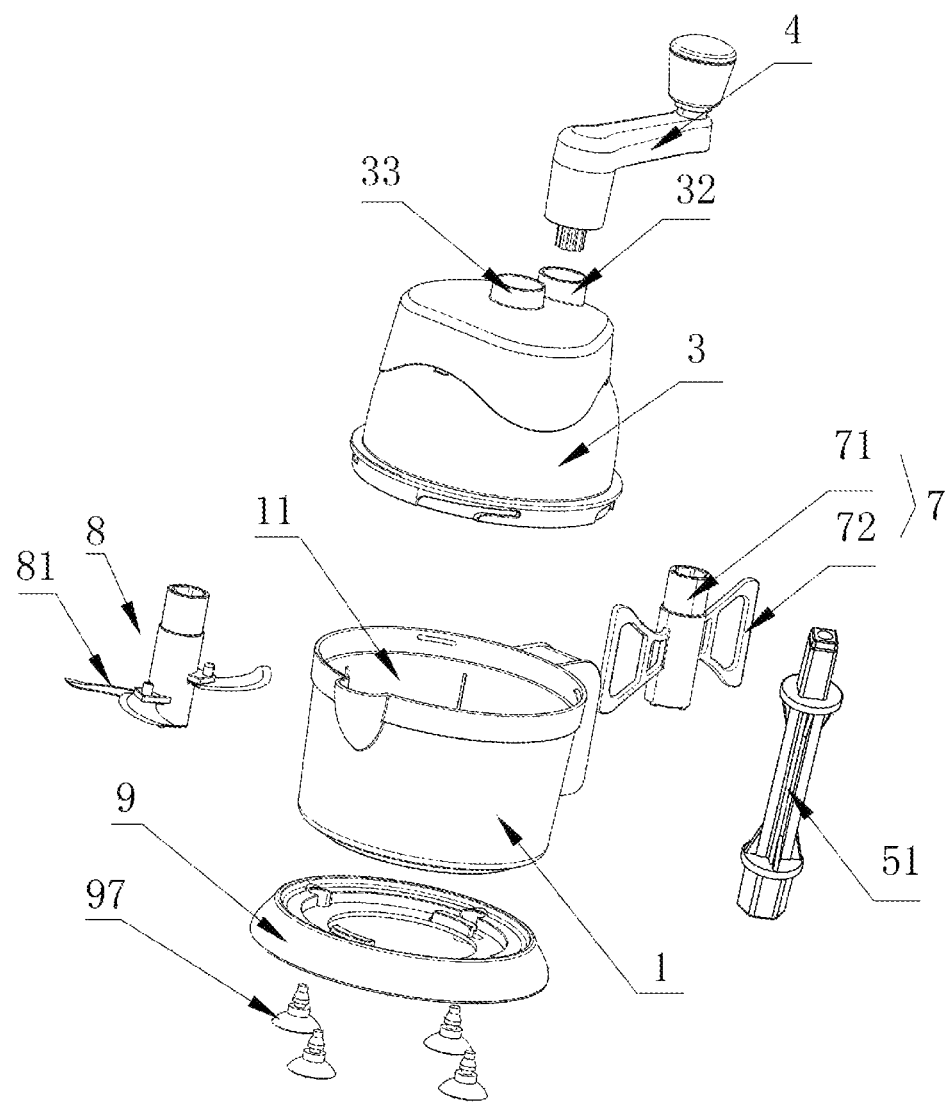
FIG. 2 is a structure exploded view of a first embodiment according to the present utility model.
Figure 3:
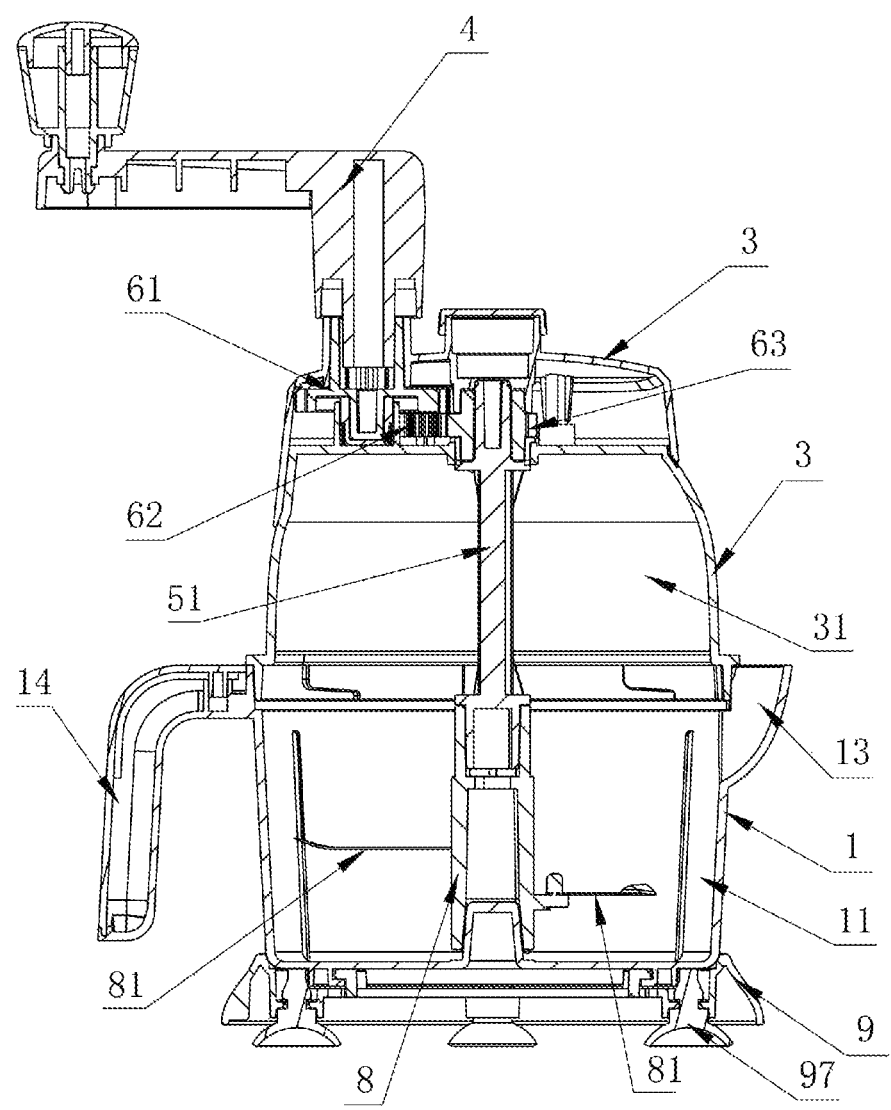
FIG. 3 is a structure cross-sectional view of a first embodiment according to the present utility model.
Figure 4:
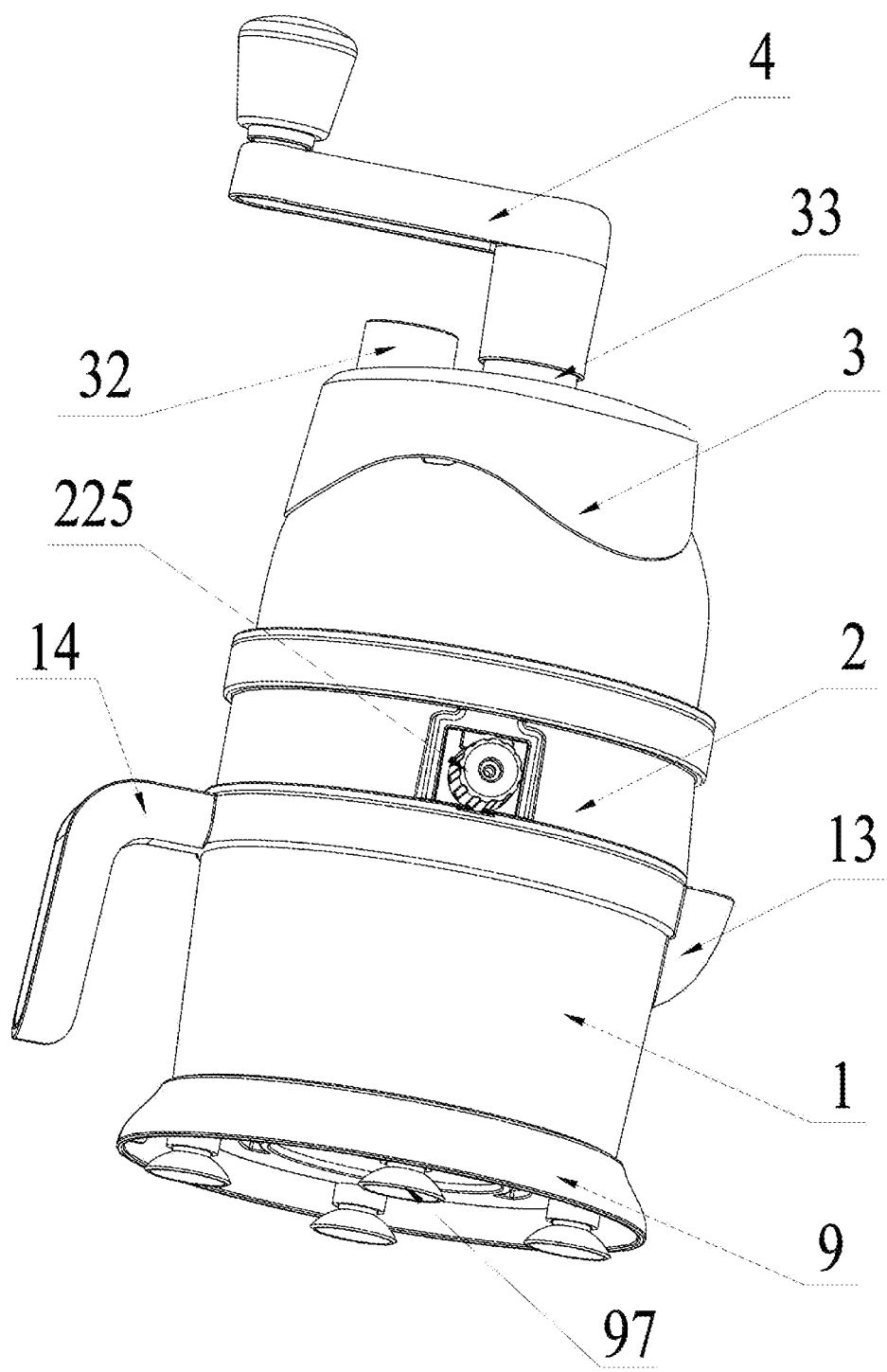
FIG. 4 is a structural diagram of a second embodiment according to the present utility model.
Figure 5:
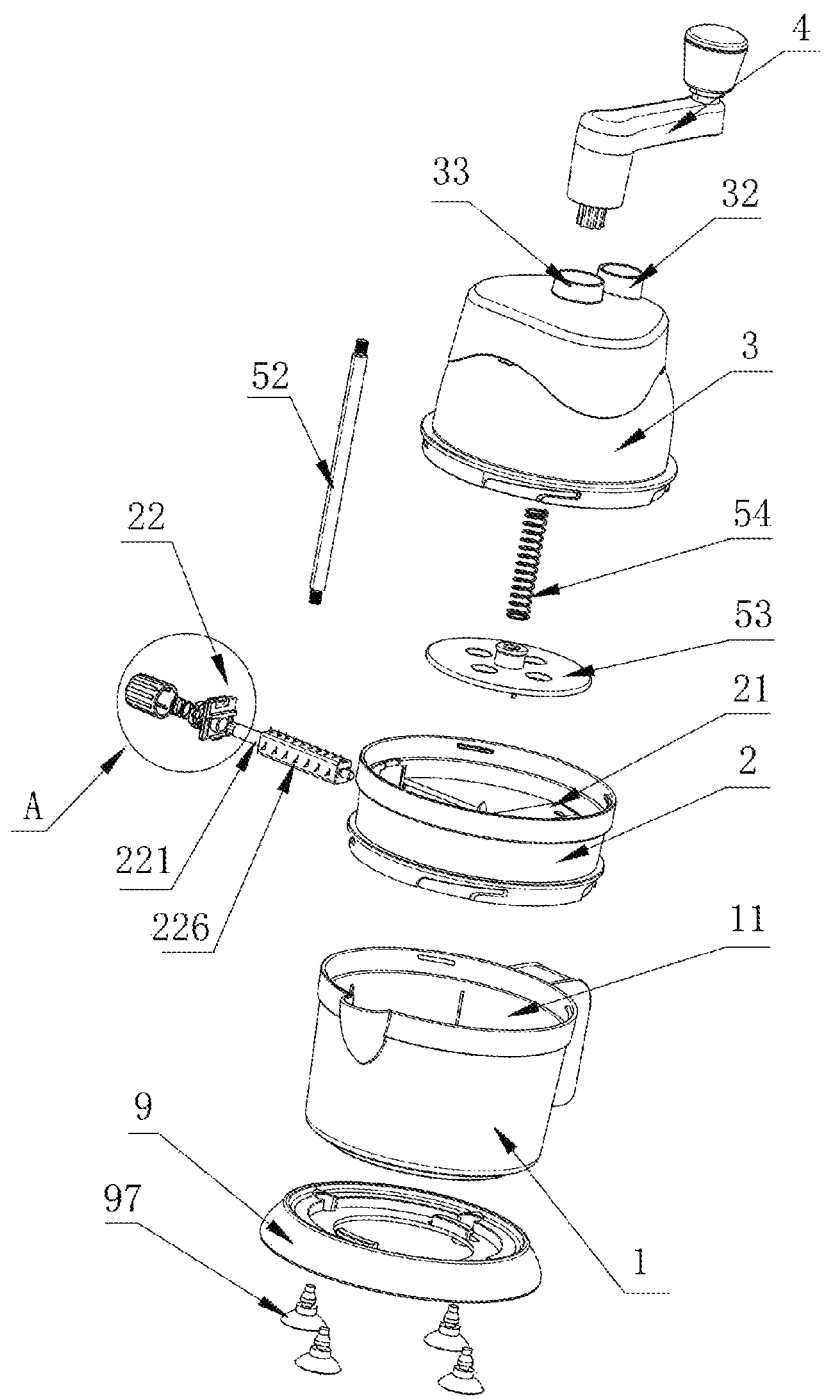
FIG. 5 is a structure exploded view of a second embodiment according to the present utility model.
Figure 6:
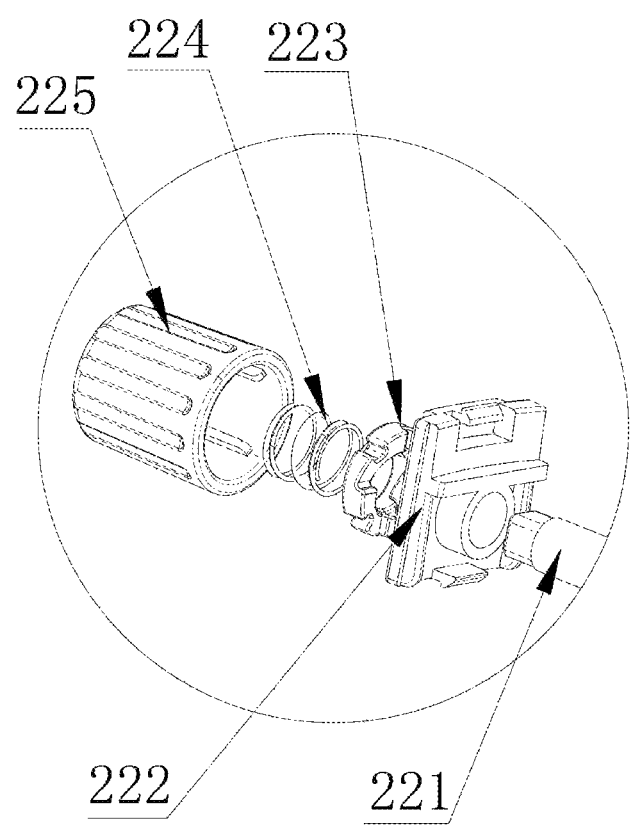
FIG. 6 is a partially enlarged view of an A position of FIG. 5.
Figure 7:
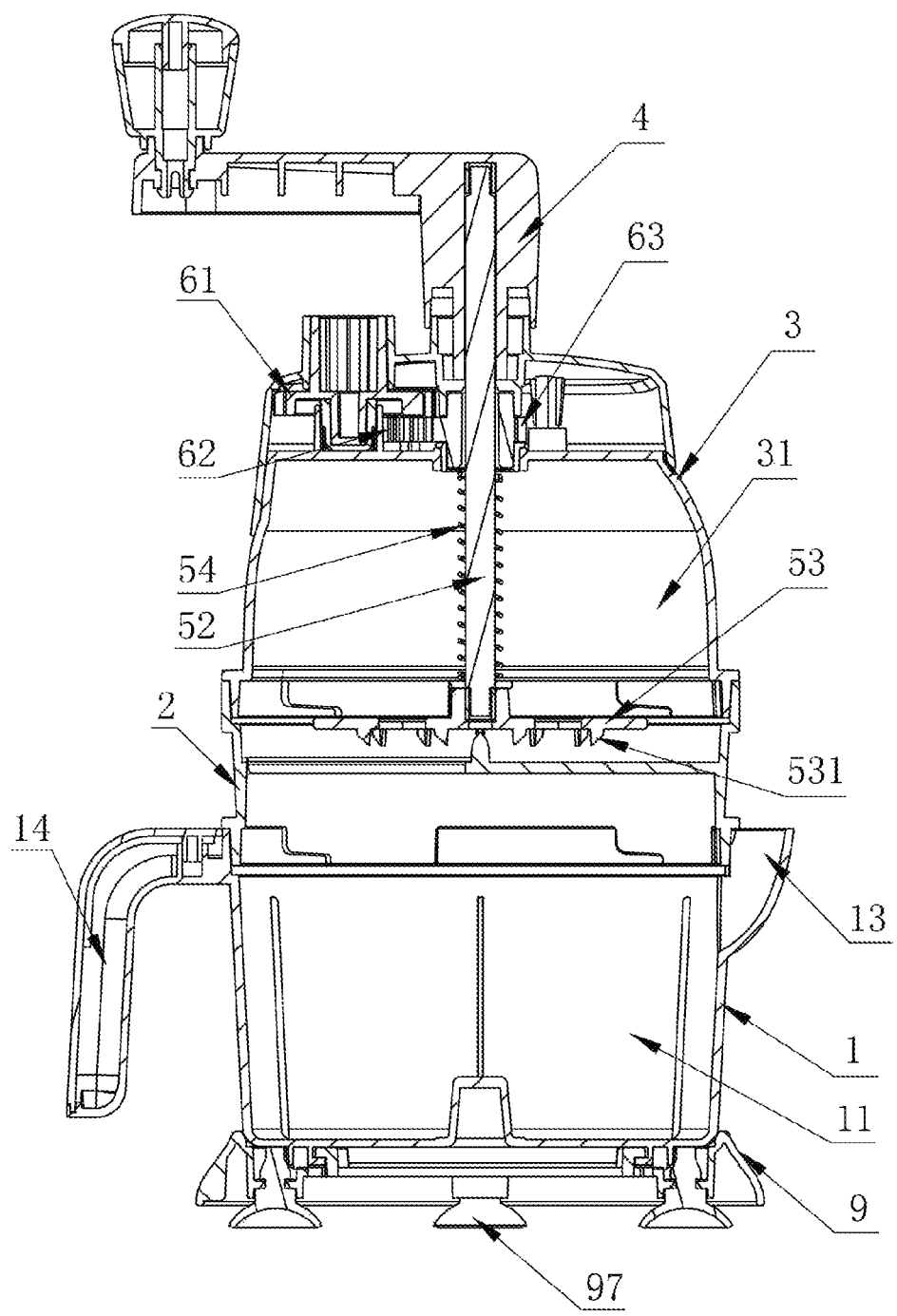
FIG. 7 is a structure cross-sectional view of a second embodiment according to the present utility model.
Figure 8:
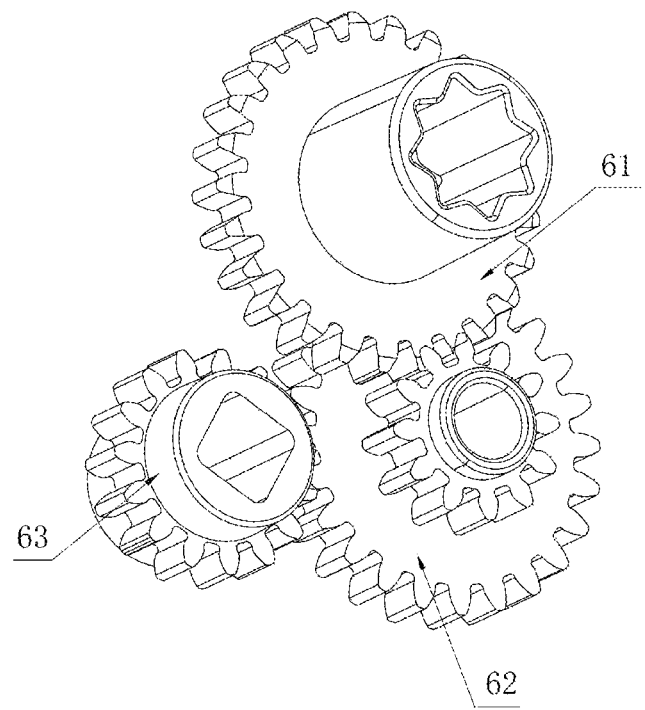
FIG. 8 is a diagram of engagement between various gears of a drive device according to the present utility model.
Figure 9:
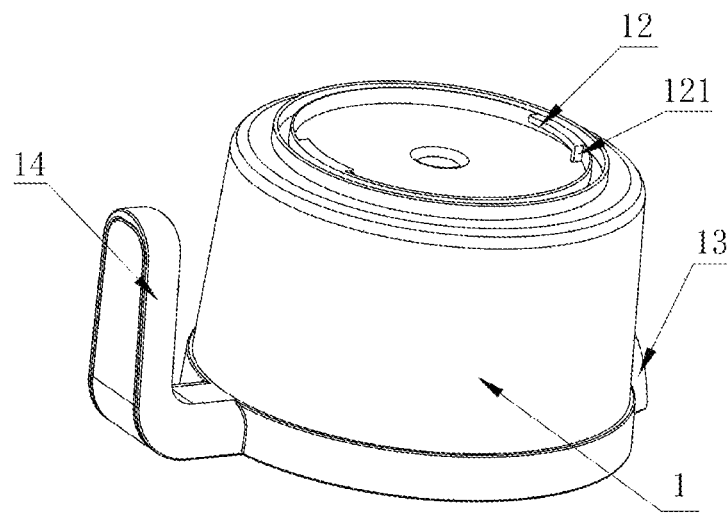
FIG. 9 is a structural diagram of a bottom of a container according to the present utility model.
Figure 10:
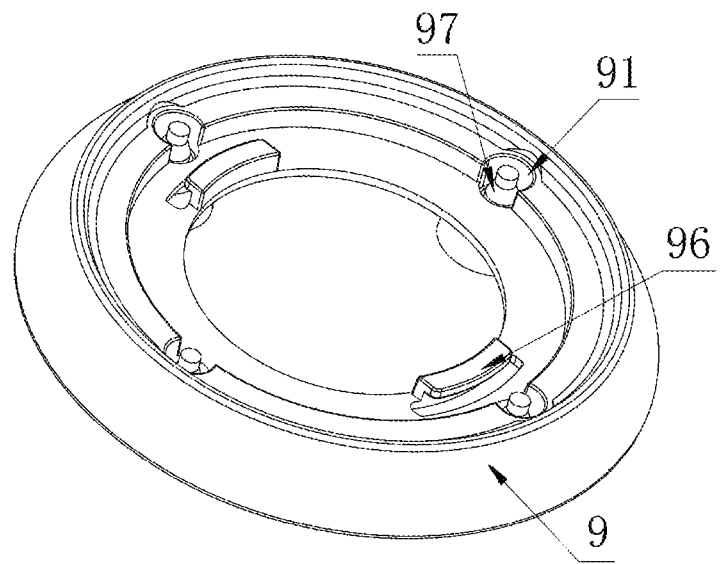
FIG. 10 is a structural diagram of a base according to the present utility model.
Figure 11:
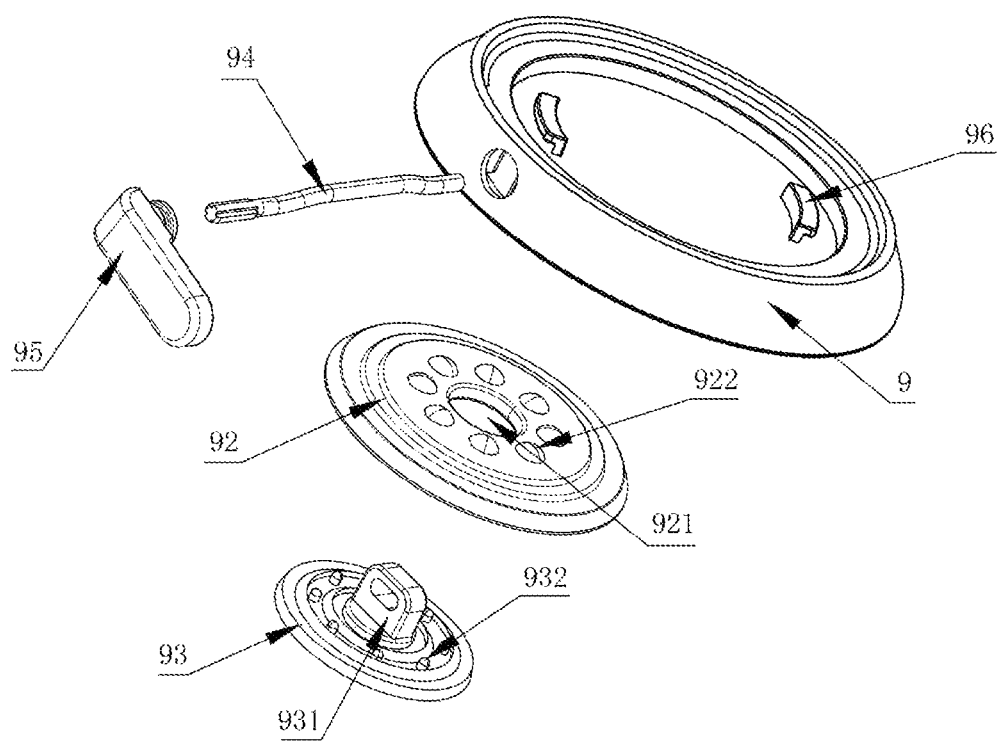
FIG. 11 is a structural diagram of a second embodiment of a sucking disc and a corresponding base according to the utility model.

The present utility model will be further described in combination with drawings and embodiments, see FIG. 1-FIG. 11.

Provided is a multifunctional food processor, comprising a container 1, a top cover 3 and a drive component, wherein, a first working chamber 11 is arranged in the container 1, and a second working chamber 31 is arranged in the top cover 3; the top cover 3 is arranged on the container 1 in a matching manner, and the drive component comprises a drive rod which downwardly extends from the top cover and is provided with a food processing device in a matching manner.

The top cover 3 is provided with a first connection hole 32 and a second connection hole 33, a shaking handle 4 is detachably mounted on the first connection hole 32 or the second connection hole 33, and a power rod 51 or a connection rod 52 is detachably mounted in the second connection hole 33.

A drive device is also arranged in the top cover 3, the drive device comprising a first gear 61, a second gear 62 and a third gear 63; the first gear 61 is mounted in the first connection hole 32, the third gear 63 is mounted in the second connection hole 32, the first gear and the second gear are in mutually engagement transmission, and the third gear and the second gear are in mutual engagement transmission.

As a first embodiment of the present utility model, the top cover is directly mounted on the container. At this moment, the drive rod is the power rod.

The shaking handle 4 is detachably connected to the first connection hole 32 through the first gear 61, the power rod 51 is detachably connected to the second connection hole 33 through the third gear 63, and the shaking handle 4 drives the power rod 51 to rotate in the second working chamber 31 through the drive device. The processing device is a stirring device 7 or a cutting device 8 detachably mounted in the first working chamber 11, and a connection post 71 used for connecting the power rod 51 is formed on the stirring device 7 or the cutting device 8. In this embodiment, the connection post 71 is a hollow cylinder whose two ends are both provided with mounting holes, the lower end of the connection post is mounted on a protrusion arranged in the center of the bottom of the container 1, and the upper end of the connection post 71 is connected with the lower end of the power rod 51. When in use, the shaking handle is shaken only by a hand, the shaking handle drives the power rod to rotate by the drive device so as to drive the stirring device 7 or the cutting device 8 to rotate to stir or cut the food in the container 1.

A plurality of connection blocks, preferably three connection blocks, are formed on the peripheral surface of the connection post of the cutting device 8 in a surrounding manner, blades 81 are respectively mounted on the connection blocks, and the three blades 81 can chop various vegetables in the process of quick rotation. Stirring blades 72, preferably two stirring blades, are formed on the peripheral surface of the connection post of the stirring device 7 in a surrounding manner, and the two stirring blades 72 can stir together various vegetables in the process of quick rotation.

In order to ensure the connection reliability of the power rod and the connection post, the power rod can be provided as a polygon, and the inner wall of the hollow cavity connected with the power rod in the middle of the connection post is also provided as a polygon corresponding to the power rod.

As a second embodiment of the present utility model, the food processing device is a cutter disc device, the top cover is mounted on the cutter disc device, and then the cutter disc device is mounted on the container. At this moment, the drive rod is the connection rod.

The food fixation device is detachably mounted in the second working chamber 31, the food fixation device comprises the connection rod 52 and a fixation disc 53, the connection rod 52 passes through the second connection hole 33 to be located in the second working chamber 31, the upper end of the connection rod 52 is in threaded connection to the lower end of the shaking handle 4, the lower end of the connection rod 52 is in threaded connection with the fixation disc 53, a plurality of fixation teeth 531 for fixing food are formed on the fixation disc 53, the periphery of the connection rod 52 is sleeved with a first spring 54, the shaking handle 4 drives food to rotate and cut on the cutter disc device 2 through the connection rod 52 and the fixation disc 53.

A cutting blade 21 and a rotation knife rest 22 are mounted on the cutter disc device 2, the rotation knife rest 22 comprises a knife rest body 221, a limit piece 222, a rotation member 223, a second spring 224 and a rotation idler wheel 225, the knife rest body 221 is in a strip-shaped structure, the knife rest body 221 is provided with knife teeth 226 having different specifications, the knife rest body 221 is fixedly mounted on the cutter disc device 2 through the limit piece 222, the rotation member 223 is mounted on the knife rest body 221 through the limit piece 222, the rotation idler wheel 225 is arranged at the periphery of the rotation member 223 and drives the rotation member 223 to rotate the knife rest body 221 through the second spring 224.

When in use, the rotation knife rest 2 is rotated to the knife teeth having a required specification, the upper end of food is inserted on the fixation teeth of the fixation disc, the lower end abuts against the cutter disc device, and then the top cover is mounted on the cutter disc device. Since food has a certain volume, the first spring is compressed, and the connection rod extends out from the top cover; when the shaking handle is shaken by the hand, food is rotated and cut on the cutter disc device under the drive of the connection rod. When the volume of food is gradually reduced, it is convenient for a user to gradually downwardly drive food to be cut into slices or shreds when the shaking handle is shaken by the hand due to the elastic force of the first spring, and thus operation is time-saving and labor-saving.

Food is cut on the cutter disc device and then dropped into the container below, and the container takes a good collection effect. After slicing or shredding is completed, the cutter disc device is detached, and food in the container is poured out or the top cover is mounted on the container to stir or further chop food.

Based on the above two embodiments, the lower part of the container 1 can be detachably mounted on a base 9, a sucking disc mounting seat 91 is formed on the base 9, and a sucking disc assembly is mounted in the sucking disc mounting seat 91. As the first embodiment of the sucking disc assembly of the present utility model, the sucking disc assembly comprises a plurality of small sucking discs 97, and the small sucking discs 97 are mounted in the sucking disc mounting seat through a sucking disc screw and a sucking gasket in a matching manner. In this embodiment, the number of the small sucking discs 97 is preferably four, the four small sucking discs 97 are distributed at the bottom of the base in a ring array. The small sucking disc used in the present utility model has a large sucking force, and is extremely stable when being connected with an operation platform.

As the second embodiment of the sucking disc assembly of the present utility model, the sucking disc assembly comprises a sucking disc 92 and a sucking disc core 93, the sucking disc 92 is fixedly mounted on the sucking mounting seat located under the base, this sucking disc mounting seat is of a ring shape, a pit 922 is arranged on the edge of the sucking disc 92, a protrusion 932 is formed on the edge of the sucking disc core 93 corresponding to the pit, the protrusion 932 on the sucking disc core 93 is inserted into the pit 922 on the sucking disc 92 to be overlapped, and then inserted into the sucking disc mounting seat 91, the middle of the sucking disc core 93 is provided with a pull portion 931, and the pull portion 931 passes through the center hole 921 of the sucking disc 92 to be arranged on the sucking disc mounting seat; the sucking disc assembly also comprises a sucking disc locking device which comprises a bent sucking disc pull rod 94 and a sucking disc wrench 95, the upper end of the pull portion 931 is provided with a hole slot, one end of the sucking disc pull rod 94 passes through a through hole on the side of the base and the hole slot of the sucking disc core 93 to abut against the round hole of the sucking disc mounting seat, and the sucking wrench 95 is fixed at the other end of the sucking disc pull rod 94 and clamped outside the through hole in the side of the base. The sucking disc wrench 95 is wrenched, the sucking disc pull rod 94 drives the pull portion 931 to push or pull the sucking disc core 93 along with the rotation of the sucking disc pull rod 94, thereby achieving the sucking and releasing effects of the sucking disc. This sucking disc assembly has a large sucking force and is matched with the sucking disc locking device, so that the base can be firmly adsorbed on the working platform. When not in use, the base is separated from the working platform only by wrenching the sucking disc wrench. Thus, operation is convenient, and effect is good.

A plurality of clamp blocks 96 are formed on the base 9, the bottom of the container 1 corresponding to the clamp blocks is provided with clamp grooves 12, one end of the clamp groove 12 is provided with an obstruction portion 121, the base 9 is screwed and connected with the container 1 through the clamp block 96 and fixed through the obstruction portion 121, thereby enhancing the stability of the structure.

The upper end of the container 1 is protruded outwardly to form a liquid pouring hole 13, so as to facilitate juice generated when food is processed is poured out. Meanwhile, the periphery of the container 1 is also provided with a handle 14, which is convenient to take.

The present utility model simultaneously has functions of chopping, shredding, slicing or stirring food and the like, is wide in application range, more practicable, convenient to operate and high in structure stability. Various parts are all in detachable connection. After use, the present utility model is convenient to and clear and wash, and can greatly save production, package and operation costs and the like.

Those skilled in the art should understand that the present utility model is not limited to the above embodiments, descriptions in the above embodiments and specification are only for explaining the principle of the present utility model, various variations and improvements of the present utility model can also be made without departing from the spirit and scope of the present utility model, and all of these variations and improvements fall within the scope of the present utility mode. The scope claimed by the present utility model is defined by appended claims and their equivalents.

I claim:

1. A food multifunctional processor, comprising a container, a top cover and a drive component;
   wherein, the container has a first working chamber, and the top cover has a second working chamber;
   the top cover is configured to cover the container, so that the first working chamber is in communication with the second working chamber;
   the drive component comprises a handle, and a drive rod which downwardly extends from the top cover; a food processing device is arranged on the drive rod; a first connection hole and a second connection hole are located on the top cover,
   the handle is detachably mounted on the first connection hole, and the drive rod is arranged within the second connection hole;

a transmission device is arranged within the top cover to connect the handle and the drive rod, allowing a rotation of the handle to be transmitted to the drive rod;

the food processing device is a cutter disc device which is detachably arranged between the container and the top cover;

the food processing device is detachably arranged in the first working chamber, and the food processing device is a stirring device or a cutting device which is arranged at the lower end of the drive rod;

the transmission device comprises a first gear, a second gear, and a third gear; the handle is detachably connected to the first connection hole through the first gear; the drive rod is detachably connected to the second connection hole through the third gear, and the second gear is located between the first gear and the third gear so as to allow the rotation of the handle to be transmitted to the drive rod through the transmission device.

2. The food multifunctional processor according to claim 1, wherein a cutting blade and a rotation knife rest are mounted on the cutter disc device;

the rotation knife rest comprises a knife rest body, a limit piece, a rotation member, a drive spring and a rotation idler wheel;

the knife rest body is fixedly mounted on the cutter disc device through the limit piece;

the rotation member is mounted on the knife rest body through the limit piece; and the rotation idler wheel is arranged at the periphery of the rotation member and drives the rotation member to rotate the knife rest body through the drive spring.

3. The food multifunctional processor according to claim 1, wherein the container is detachably mounted on a base; a sucking disc mounting seat is formed beneath the base; and a sucking disc assembly is arranged in the sucking disc mounting seat.

4. The food multifunctional processor according to claim 1, wherein an upper end of the container is protruded outwardly to form a liquid pouring hole.

\* \* \* \* \*